(12) United States Patent
Chane-Ching

(10) Patent No.: US 7,572,835 B2
(45) Date of Patent: Aug. 11, 2009

(54) DISPERSION OF A RARE EARTH PHOSPHATE, AND A PROCESS FOR ITS PREPARATION

(75) Inventor: Jean-Yves Chane-Ching, Eaubonne (FR)

(73) Assignee: Rhodia Electronics & Catalysis, La Rochelle (FR)

( * ) Notice: Subject to any disclaimer, the term of this patent is extended or adjusted under 35 U.S.C. 154(b) by 0 days.

(21) Appl. No.: 11/638,907

(22) Filed: Dec. 14, 2006

(65) Prior Publication Data

US 2007/0117871 A1 May 24, 2007

Related U.S. Application Data

(62) Division of application No. 10/433,739, filed as application No. PCT/FR01/03875 on Dec. 7, 2001, now Pat. No. 7,169,820.

(30) Foreign Application Priority Data

Dec. 8, 2000 (FR) .................................. 00 16005

(51) Int. Cl.
*C01B 25/37* (2006.01)
*C01B 25/45* (2006.01)
*C01F 17/00* (2006.01)
*B01J 13/00* (2006.01)
*C09K 11/70* (2006.01)
*C09K 3/14* (2006.01)

(52) U.S. Cl. ................... 516/89; 524/403; 106/14.12; 106/286.1; 252/301.4 P

(58) Field of Classification Search ................ 516/89; 106/14.12, 286.1; 524/403; 423/263; 252/584, 252/301.4 P
See application file for complete search history.

(56) References Cited

U.S. PATENT DOCUMENTS 2,082,233 A    6/1937  Muller ........................ 167/68
3,516,807 A    6/1970  West et al. .................... 48/107
5,340,556 A *  8/1994  Collin et al. ................. 423/263
5,470,503 A * 11/1995  Braconnier ........... 252/301.4 P
7,122,581 B1* 10/2006  Braconnier .................. 516/89
7,169,820 B2*  1/2007  Chane-Ching ............... 516/89

FOREIGN PATENT DOCUMENTS

EP   0 308 311         3/1989
EP   0 902 103 A1 *    3/1999
WO   WO 00/76918      12/2000

OTHER PUBLICATIONS

PTO 06-1727, English Language translation of WO 00/76918 A1 (Jan. 2006), USPTO, Wash., DC, pp. Title page & 1-18.*
Boakye et al: "Porous Aluminum Oxide and Lanthanum Phosphate Fiber Coatings", Proceedings of the 1996 20th Annual Conf. on Composites Advanced Ceramics, Materials and Structures BI Cocoa Beach, FL., Jan. 1, 1996, vol. 17, No. 4, 1996, pp. 53-60; XP 00212977 Ceram. Eng. Sci Proc; Ceram. Eng. & Sci. Proceedings 1996 American Ceramic SRC.*
Peng Chen et al: "Synthesis and characterization of Tanthanum phosphate sol for fibre coating" Journal of Materials Science, Chapman and Hall Ltd., London, GB, vol. 32, No. 14, Jul. 15, 1997, pp. 3863-3867, XP002129771, ISSN: 0022-2461 the whole document.
International Search Report, PCT/FR01/03875, (Mar. 2002), pp. 1-4.

* cited by examiner

*Primary Examiner*—Daniel S Metzmaier
(74) *Attorney, Agent, or Firm*—Buchanan, Ingersoll & Rooney P.C.

(57) ABSTRACT

The invention concerns a colloidal dispersion of a phosphate of a rare earth and a process for its preparation. The dispersion is characterized in that it comprises anisotropic and disaggregated or disaggregatable particles of a phosphate of at least one rare earth and an anion of a monobasic acid, soluble in water and with a pKa of at least 2.5. It is prepared by a process in which a solution of a salt of at least one rare earth is mixed with phosphate ions while controlling the pH of the reaction medium to a value in the range 4 to 9 and in the presence of a monobasic acid, soluble in water and with a pKa of at least 2.5; the mixture obtained optionally undergoes a maturing step; the precipitate is then separated from the reaction medium; and said precipitate is then dispersed in water.

12 Claims, No Drawings

DISPERSION OF A RARE EARTH PHOSPHATE, AND A PROCESS FOR ITS PREPARATION

This application is a division of U.S. application Ser. No. 10/433,739, filed on Oct. 29, 2003, now U.S. Pat. No. 7,169,820, which was filed under 35 U.S.C. §371 based on International Application No. PCT/FR01/03875, filed on Dec. 7, 2001.

The present invention relates to a colloidal dispersion of a rare earth phosphate, and to a process for its preparation.

Great advances are currently being made in the fields of luminescence and electronics. Examples of such developments that can be cited are the development of plasma systems (screens and lamps) for novel visual display and lighting devices. Such novel applications require luminophores with ever improving properties. In addition to their luminescence, those materials are required to exhibit specific morphology or grain size characteristics, to facilitate their use in the applications under consideration.

More precisely, luminophores are required to be in the form of very fine particles that are distinct and as separate as possible.

Sols or colloidal dispersions can constitute an advantageous route to such products.

The present invention aims to provide a sol that can in particular be used in the fields of luminescence and electronics from which fine, properly disaggregated products can be obtained.

To this end, the colloidal dispersion of the invention is characterized in that it comprises anisotropic and disaggregated or disaggregatable particles of a phosphate of at least one rare earth and an anion of a monobasic acid, soluble in water and with a pKa of at least 2.5.

The invention also concerns a process for preparing said dispersion, comprising the following steps:

mixing a solution of a salt of at least one rare earth with phosphate ions, controlling the pH of the reaction medium to a value in the range 4 to 9 and in the presence of a monobasic acid, soluble in water and with a pKa of at least 2.5;

separating the precipitate from the reaction medium;

re-dispersing said precipitate in water.

The particles of the dispersion of the invention can have a homogeneous, distinct and separated morphology, rendering the dispersion particularly useful for applications employing luminophores.

Further characteristics, details and advantages of the invention will become clearer from the following description and non-limiting examples intended to illustrate the invention.

The term "rare earth" as used in the description means elements from the group formed by yttrium and elements from the periodic table with an atomic number in the range 57 to 71 inclusive.

The invention is applicable to dispersions or sols of a phosphate of one or more rare earths. This means particles essentially based on orthophospates with formula $LnPO_4$, Ln meaning one or more rare earths.

Further, throughout the description, the expression "colloidal dispersion" or "sol" of a rare earth phosphate means any system constituted by fine solid particles of colloidal dimensions generally based on a rare earth phosphate as defined above, which may be hydrated, and in suspension in an aqueous liquid phase. These particles can also contain a certain quantity of an anion of the monobasic acid defined above. They can optionally also contain residual quantities of bound or adsorbed ions that may originate from rare earth salts used in preparing the dispersion, such as nitrate, acetate, chloride, citrate, ammonium anions or sodium ions, or phosphate anions ($HPO_4^{2-}$, $PO_4^{3-}$, $P_3O_{10}^{5-}$ ... ). It should be noted that in such dispersions, the rare earth can either be completely in the form of colloids, or simultaneously in the form of ions and colloids. Preferably, at least 80% of the rare earth is in the colloidal form.

The aqueous liquid phase can also comprise the monobasic acid or the anion of this acid, the anions defined above of the rare earth salts and phosphate ions in various forms.

The present invention is of particular application when the rare earth is lanthanum, cerium, praseodymium, gadolinium or yttrium. It is also of particular application to colloidal dispersions of ternary phosphates of lanthanum, cerium and terbium. Regarding these ternary phosphates, more particular mention can be made of those with formula $La_xCe_yTb_{1-x-y}PO_4$ in which x is between 0.4 and 0.7 inclusive and x+y is more than 0.7. The invention is also applicable to mixed phosphates of lanthanum and europium or of lanthanum and thulium or lanthanum, thulium and gadolinium. For phosphates containing thulium, the amount of thulium, expressed as the atomic % with respect to lanthanum, can be in the range 0.1 to 10, more particularly in the range 0.5 to 5, and for those containing gadolinium, the amount of this latter element, expressed as the atomic % with respect to lanthanum, can be in the range 10% to 40%, for example.

The concentrations of the dispersions of the invention are generally at least 15 g/l (5% by weight); in particular they can be in the range 20 g/l to 100 g/l (2% to 10% by weight), the concentrations being expressed as the equivalent concentration of rare earth oxide. The concentration is determined after drying and calcining a given volume of dispersion in air.

The particles of the sol or dispersion of the invention have a specific and homogeneous shape. They are anisotropic as regards their morphology. More precisely, they are acicular in shape.

More particularly, they can have a length/width ratio of at least 10. This ratio can be at least 30 and is preferably at least 50. They can also have a length of at least 50 nm, in particular in the range 50 μm to 600 μm. They can be at most 10 nm long, more particularly at most 5 nm.

The above sizes are determined by HRTEM (high resolution transmission electron microscopy), if necessary complemented by cryomicroscopy.

In addition to their small size, the colloids of the dispersions of the invention are slightly agglomerated or not agglomerated at all. Transmission electron cryomicroscopic analysis on frozen samples (Dubochet technique) exhibits a low degree of colloid agglomeration of, for example, less than 40%, more particularly less than 10%, preferably less than 5% in number, i.e., for the set of articles or particles observed, at least 60%, more particularly 90% and still more particularly at least 95% is constituted by a single crystallite.

In some cases, corresponding to high concentration dispersions, the particles do not have the degree of disaggregation given above, however, they can be disaggregated by simple dilution, bringing the dispersion into the concentration range given above or towards the lower values of that range.

This state of particle disaggregation can also be demonstrated indirectly. For a concentration in the range 2% to 10% by weight as defined above, the dispersions of the invention exhibit birefringence, which can be demonstrated by positioning a sample of the dispersion between crossed polarisers. This birefringence is due to the very good disaggregation of the particles, which allows them to align. As before, in the case of a high concentration and in the absence of birefringence, it is possible to cause this birefringence to appear by diluting the dispersion.

A further characteristic of the dispersion of the invention is that they comprise an anion of a monobasic acid, soluble in water and with a pKa of at least 2.5. More particularly, the pKa of the acid is at most 5. Suitable acids that can be cited are acetic acid, formic acid, propionic acid and monochloroacetic acid. Acetic acid is preferred. A plurality of monobasic acids can be present in the same dispersion.

The amount of monobasic acid, expressed as the number of moles of monobasic acid with respect to the number of atoms of rare earth, is generally at most 0.1, preferably at most 0.05. This amount is applicable to the sum of the acids if the dispersion comprises a plurality of acids.

This amount of acid is determined by chemical assay of the carbon and the rare earth in colloids recovered after ultracentrifuging at 50000 rpm for 6 hours.

The process for preparing the dispersions of the invention will now be described.

As indicated above, the process comprises a first step in which a solution of a salt of at least one rare earth is reacted with phosphate ions. When preparing a phosphate of a plurality of rare earths, the starting solution comprises the salts of all of the rare earths concerned.

The rare earth salts can be salts of inorganic acids or organic acids, for example of the sulphate, nitrate, chloride or acetate type. It should be noted that the nitrate and the acetate are particularly suitable. More particularly, the cerium salts can be cerium III acetate, cerium III chloride or cerium III nitrate or cerium IV nitrate and mixtures of these salts such as acetate/chloride mixtures.

The phosphate ions can be provided by means of pure compounds or compounds in solution, such as phosphoric acid, and phosphates of alkalis or other metallic elements. In this regard, sodium mono- or di-hydrogen phosphate should be mentioned. The phosphate ions are preferably added in the form of a solution of an ammonium phosphate that can, more particularly, be diammonium or monoammonium phosphate.

The reaction between the rare earth salt and the phosphate ions is carried out in the presence of a monobasic acid. Further, this reaction is carried out by controlling the pH of the reaction medium to a value in the range about 4 to about 9, preferably in the range 5 to 8.5.

The term "controlling the pH" means maintaining the pH of the reaction medium at a certain value, which is constant or substantially constant, by adding basic compounds or buffer solutions to the medium. The pH of the medium will then vary by at most 0.5 units about a fixed reference value, more preferably by at most 0.1 pH units about this value.

The pH is advantageously controlled by adding a basic compound. Examples of suitable basic compounds that can be cited are metallic hydroxides (NaOH, KOH, CaOH$_2$ . . . ) or ammonium hydroxide, or any other basic compound the constituent species of which form no precipitate on addition to the reaction medium, by combination with one of the species also contained in this medium, allowing the pH of the precipitation medium to be controlled. A preferred basic compound of the invention is ammonia, advantageously used in the form of an aqueous solution.

In a particular implementation, mixing of, or the reaction between, the rare earth salt and the phosphate ions can be carried out by introducing the solution of the rare earth salt into a second solution containing phosphate ions. Simultaneously with this introduction, a basic compound of the type just described is added to the medium to control the pH. Finally, the solution containing the phosphate ions can be a solution of phosphoric acid that has preferably been neutralised to a pH in the range 5 to 8.5.

A precipitate is obtained at the end of this first step.

In a variation of the process of the invention, the medium obtained at the end of the first step of the process can be matured. Preferably, this maturing step is carried out by heating the medium to a temperature of at least 30° C., preferably at least 50° C. By way of example, this temperature can be in the range 30° C. to 180° C.

Depending on the temperatures employed, this maturing step can be carried out either under normal atmospheric pressure or at a pressure such as the saturated vapour pressure correspond to the temperature of the maturing step. When the temperature of this maturing step is selected so as to be higher than the reflux temperature of the reaction mixture (i.e., generally, more than 100° C.), the operation is carried out by introducing the aqueous mixture into a closed vessel (closed reactor, usually termed an autoclave); the necessary pressure then results simply from heating the reaction medium (autogenous pressure). Under the temperature conditions given above, and in an aqueous medium, it is possible to specify, by way of illustration, that the pressure in the closed reactor is in the range from a value of more than 1 bar ($10^5$ Pa) to 165 bars ($165 \times 10^5$ Pa), preferably in the range 1 bar ($5 \times 10^5$ Pa) to 20 bars ($100 \times 10^5$ Pa). Clearly, it is also possible to exert an external pressure that then supplements that caused by heating.

The maturing step can be carried out either in an atmosphere of air, or in an inert gas atmosphere, preferably nitrogen if that is the case.

The maturing period is not critical, and can vary between wide limits, for example 1 to 48 hours, preferably 2 to 24 hours.

The precipitate obtained at the end of the first step of the process or optional maturing step can be separated from the reaction medium using any suitable means, in particular filtering. The product is then taken up into dispersion in water and the dispersion or sol of the rare earth phosphate of the invention is then obtained. Advantageously, the precipitate from the reaction is washed. Washing can be carried out by adding water to the precipitate then, after stirring, separating the solid from the liquid medium, for example by centrifuging. This operation can be repeated a number of times if required.

The dispersion obtained after adding water to form a suspension can be further purified and/or concentrated by ultrafiltration.

In order to increase the stability of the dispersion obtained, it is possible to add an acid to the precipitate on taking it up into suspension in water, for example nitric acid, acetic acid, formic acid or citric acid The dispersions of the invention can be used in a number of applications. Catalysis can in particular be mentioned. The dispersions can also be used for lubrication and in ceramics. Further, these dispersions can form part of the composition of suspensions for polishing. These suspensions can be used for polishing glass, for example in glass making, glazing, plate glass, television screens, spectacles, or for polishing ceramic substances or other vitreous ceramics. More particularly, these suspensions can also be used for CMP type polishing in the electronics industry. In this case, they are particularly suitable for polishing metallic substrates used in constituting microprocessors, these substrates possibly being formed from copper, aluminium, titanium nitride or tungsten.

Finally, regarding the morphology and fineness of the colloidal particles forming them, these dispersions are particularly suitable for use in preparing luminophore compounds or in manufacturing luminescent devices, of the field effect display, plasma system or mercury vapour type, for example. Luminophores used in manufacturing such devices are employed in known techniques, for example serigraphy, electrophoresis or sedimentation.

Examples will now be given.

EXAMPLE 1

This example concerns the preparation of a colloidal dispersion of $LaPO_4$.

A solution A was obtained by placing 27.72 g of 85% phosphoric acid (240 millimoles) and 180 ml of water in a beaker. 30.2 g of 20% ammonia was then incorporated to adjust the pH to 7.

A solution B was obtained using 1145.2 g (86.4 cm³ or 240 millimoles) of 1.65 mole/kg $La(NO_3)_3$ then adding 28.8 g of 100% acetic acid (MW=60.05 g) and 124.8 g of water. Solution B contained 1 mole/l of La.

Solution A was placed in the bottom of a vessel. Solution B was incorporated into solution A at a constant rate and at a constant pH of 7. Addition was carried out over one hour. Simultaneously with adding solution B, 70.5 g of 20% $NH_4OH$ was added to regulate the pH.

The dispersion obtained was placed in an oven at 60° C. for 16 hours.

It was allowed to cool.

250 g of the dispersion obtained was weighed out.

It was centrifuged for 10 minutes at 4500 rpm.

The residue was taken up in 250 g of 1M $HNO_3$ over 15 minutes.

It was centrifuged for 10 minutes at 4500 rpm. It was re-adjusted to a volume identical to that of the dispersion obtained above with demineralised water. It was stirred for 15 minutes.

It was centrifuged for 10 minutes at 4500 rpm.

Water was added to a volume identical to that indicated above and a colloidal dispersion was obtained.

$LaPO_4$ assay of the dispersion was carried out by loss on ignition. After oven heating an aliquot with a precisely determined mass at 80° C. and calcining at a temperature of 900° C., the content was determined to be 2.9%, corresponding to 0.12 M of $LaPO_4$.

Transmission cryomicroscopy revealed acicular items with a length of 300 nm to 500 nm and a width of about 8 nm.

Dispersions of 2% to 4% by weight, observed between crossed polarisers, developed a birefringence.

The chemical composition of the particles was determined by assaying the residue obtained after ultracentrifuging at 50000 rpm for 6 hours. The following contents were obtained: La: 47.2%; P: 10.9%; C<0.2%, corresponding to the following mole ratios: La/P=0.96, C/La<0.05 and acetate/La<0.025.

EXAMPLE 2

This example concerns the preparation of a colloidal dispersion of $LaPO_4$.

A solution A was obtained by placing 13.86 g of 85% phosphoric acid (120 millimoles) and 90 ml of water in a beaker. 12.3 g of 20% ammonia was then incorporated to adjust the pH to 5.

A solution B was obtained using 72.6 g (43.2 cm³ or 120 millimoles) of 1.65 mole/kg $La(NO_3)_3$ then adding 14.4 g of 100% acetic acid (MW=60.05 g) and 62.4 g of water. Solution B contained 1 mole/l of La.

Solution A was placed in the bottom of a vessel. Solution B was incorporated into solution A at a constant rate and at a constant pH of 5. Addition was carried out over one hour. Simultaneously with adding solution B, 32.8 g of 20% $NH_4OH$ was added to regulate the pH.

The dispersion obtained was placed in an oven at 60° C. for 16 hours.

It was allowed to cool.

125 g of the dispersion obtained was weighed out.

It was centrifuged for 10 minutes at 4500 rpm.

The residue was taken up in 125 g of 1M $HNO_3$ over 15 minutes.

It was centrifuged for 10 minutes at 4500 rpm.

It was re-adjusted with demineralised water to a volume identical to that of the dispersion obtained above. It was stirred for 15 minutes.

It was centrifuged for 10 minutes at 4500 rpm.

Water was added to a volume identical to that indicated above and a colloidal dispersion was obtained that was concentrated 2.2 times by ultrafiltration.

$LaPO_4$ assay of the dispersion was carried out by loss on ignition. After oven heating an aliquot with a precisely determined mass at 80° C. and calcining at a temperature of 900° C., the content was determined to be 6%, corresponding to 0.26 M of $LaPO_4$.

Transmission cryomicroscopy showed that the articles were acicular with a length of 100 nm and a width of about 5 nm.

A 6% by weight dispersion, observed between crossed polarisers, developed birefringence.

The invention claimed is:

1. A colloidal dispersion, comprising anisotropic and disaggregated or disaggregatable acicular particles having a length/width ratio of at least 10 of a phosphate of at least one rare earth and an anion of a monobasic acid, soluble in water and with a pKa of at least 2.5, said dispersion exhibiting birefringence for a concentration expressed as equivalent concentration of rare earth oxide, in the range 2% to 10% by weight.

2. The dispersion according to claim 1, wherein the pKa is at most 5.

3. The dispersion according to claim 1, wherein the particles are acicular in shape and have a length in the range 50 nm to 600 nm.

4. The dispersion according to claim 1, wherein the rare earth phosphate is a phosphate of lanthanum or cerium.

5. The dispersion according to claim 1, wherein the rare earth phosphate is a phosphate of lanthanum, cerium and terbium.

6. The dispersion according to claim 1, wherein said monobasic acid is acetic acid.

7. A colloidal dispersion comprising:
   a liquid phase;
   acicular particles having a length/width ratio of at least 10 of a phosphate of at least one rare earth; and
   an anion of a monobasic acid, the acid being soluble in water and having a pKa of at least 2.5;
   wherein the colloidal dispersion exhibits birefringence when having a concentration expressed as an equivalent concentration of rare earth oxide of 2-10 weight percent.

8. The dispersion of claim 7, wherein at least a portion of the anion of monobasic acid is bound to or adsorbed by the particles.

9. The dispersion of claim 7, wherein at least a portion of the anion of monobasic acid is in the liquid phase.

10. The dispersion of claim 7, wherein at least 90% of the particles comprise a single crystallite.

11. The dispersion of claim 10, wherein at least 60% of the particles comprise a single crystallite.

12. The dispersion of claim 7, wherein at least 95% of the particles comprise a single crystallite.

* * * * *